United States Patent
Sakurai et al.

(10) Patent No.: US 8,885,365 B2
(45) Date of Patent: Nov. 11, 2014

(54) SWITCHING POWER SUPPLY DEVICE AND METHOD FOR CONTROL THEREOF

(71) Applicant: Fuji Electric Co., Ltd., Kawasaki (JP)

(72) Inventors: Masahiko Sakurai, Hino (JP); Yukihiro Nishikawa, Hino (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 189 days.

(21) Appl. No.: 13/675,785

(22) Filed: Nov. 13, 2012

(65) Prior Publication Data

US 2013/0141946 A1 Jun. 6, 2013

(30) Foreign Application Priority Data

Dec. 6, 2011 (JP) ................................. 2011-267227

(51) Int. Cl.
H02M 3/335 (2006.01)

(52) U.S. Cl.
CPC ............................... *H02M 3/33523* (2013.01)
USPC ..................................................... 363/21.16

(58) Field of Classification Search
CPC .............. H02M 3/33523; H02M 1/36; H02M 2001/0032; H02M 7/21; H02M 7/155; H02M 7/217; Y02B 70/16
USPC .............................. 363/15, 21.13–21.18, 108
See application file for complete search history.

(56) References Cited

U.S. PATENT DOCUMENTS

| | | | |
|---|---|---|---|
| 7,064,966 B2 * | 6/2006 | Yamada et al. | 363/21.16 |
| 7,672,146 B2 | 3/2010 | Park et al. | |
| 7,719,860 B2 * | 5/2010 | Usui | 363/21.12 |
| 7,894,223 B2 * | 2/2011 | Sato et al. | 363/97 |
| 2009/0021968 A1 | 1/2009 | Komatsu et al. | |
| 2011/0090718 A1 | 4/2011 | Morota | |

FOREIGN PATENT DOCUMENTS

| | | |
|---|---|---|
| JP | 2011-091925 A | 5/2011 |
| WO | 2007/088803 A1 | 8/2007 |

* cited by examiner

*Primary Examiner* — Adolf Berhane
*Assistant Examiner* — Yemane Mehari
(74) *Attorney, Agent, or Firm* — Rabin & Berdo, P.C.

(57) ABSTRACT

A switching power supply device and method for control thereof, including an input voltage generating unit, a transformer, an output voltage generating unit, a MOS transistor, an output voltage detecting unit, a switching control unit, and a power supply unit. The output voltage detecting unit detects a transformer tertiary winding voltage, compares it with a first reference value, compares the differentiated tertiary winding voltage with a second reference value, and determines the start and end of a detection period based on the two comparisons. The output voltage detecting unit also samples and holds the voltage with two sampling pulses within the detection period, selects one of the two sampled and held voltages, and outputs the selected voltage when the detection period ends.

20 Claims, 7 Drawing Sheets

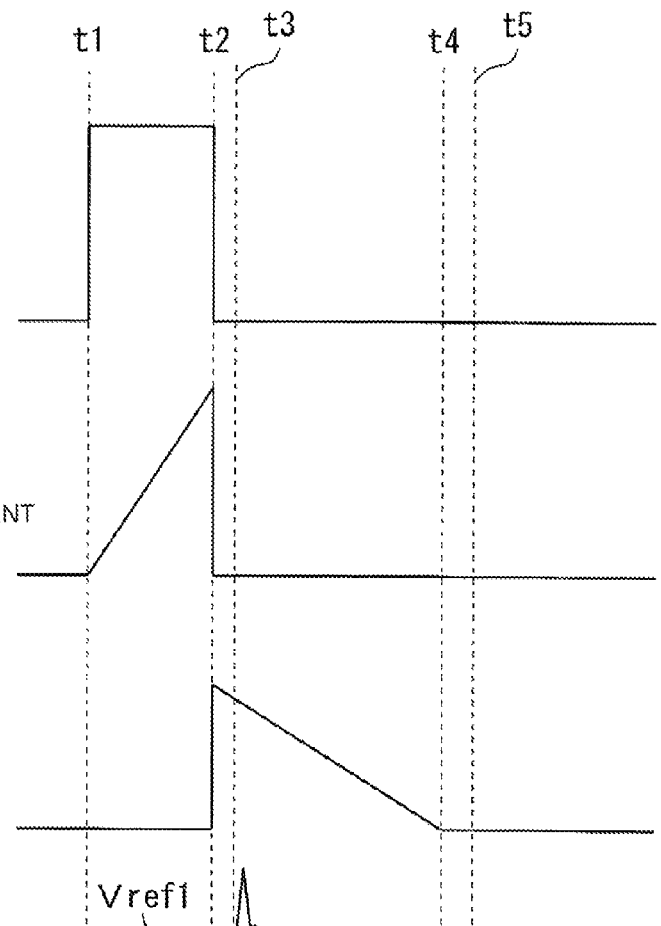
FIG. 3A GATE SIGNAL Vg
FIG. 3B PRIMARY CURRENT Ip
FIG. 3C SECONDARY CURRENT Is
FIG. 3D DIVIDED VOLTAGE Vd DIVIDED VOLTAGE Vd

SAMPLING PULSE PA

SAMPLING PULSE PB

OUTPUT VOLTAGE FROM
DIFFERENTIATION

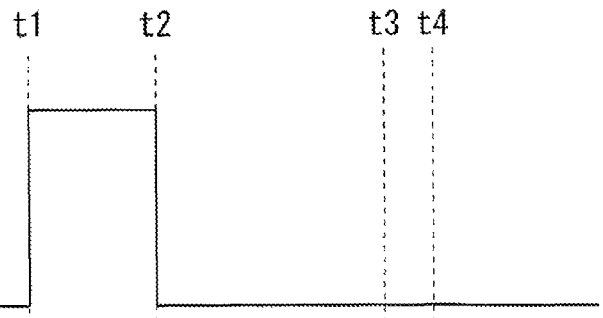
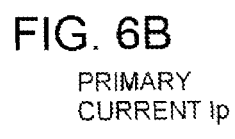
FIG. 6A
GATE SIGNAL Vg
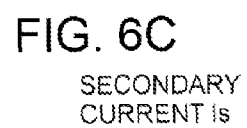
FIG. 6B
PRIMARY
CURRENT Ip
FIG. 6C
SECONDARY
CURRENT Is
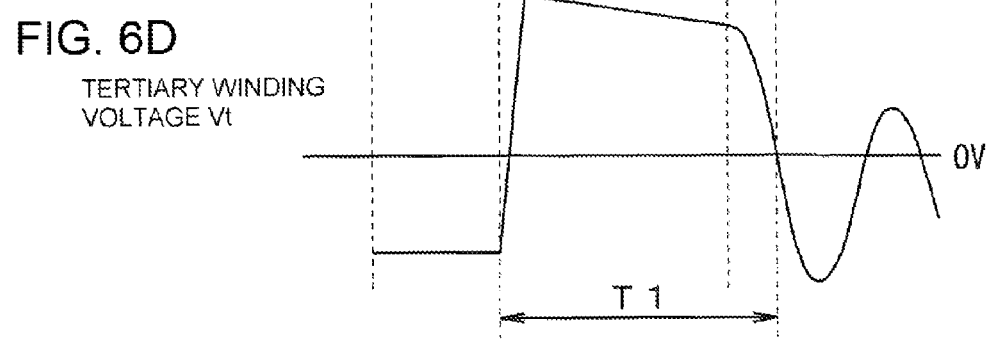
FIG. 6D
TERTIARY WINDING
VOLTAGE Vt

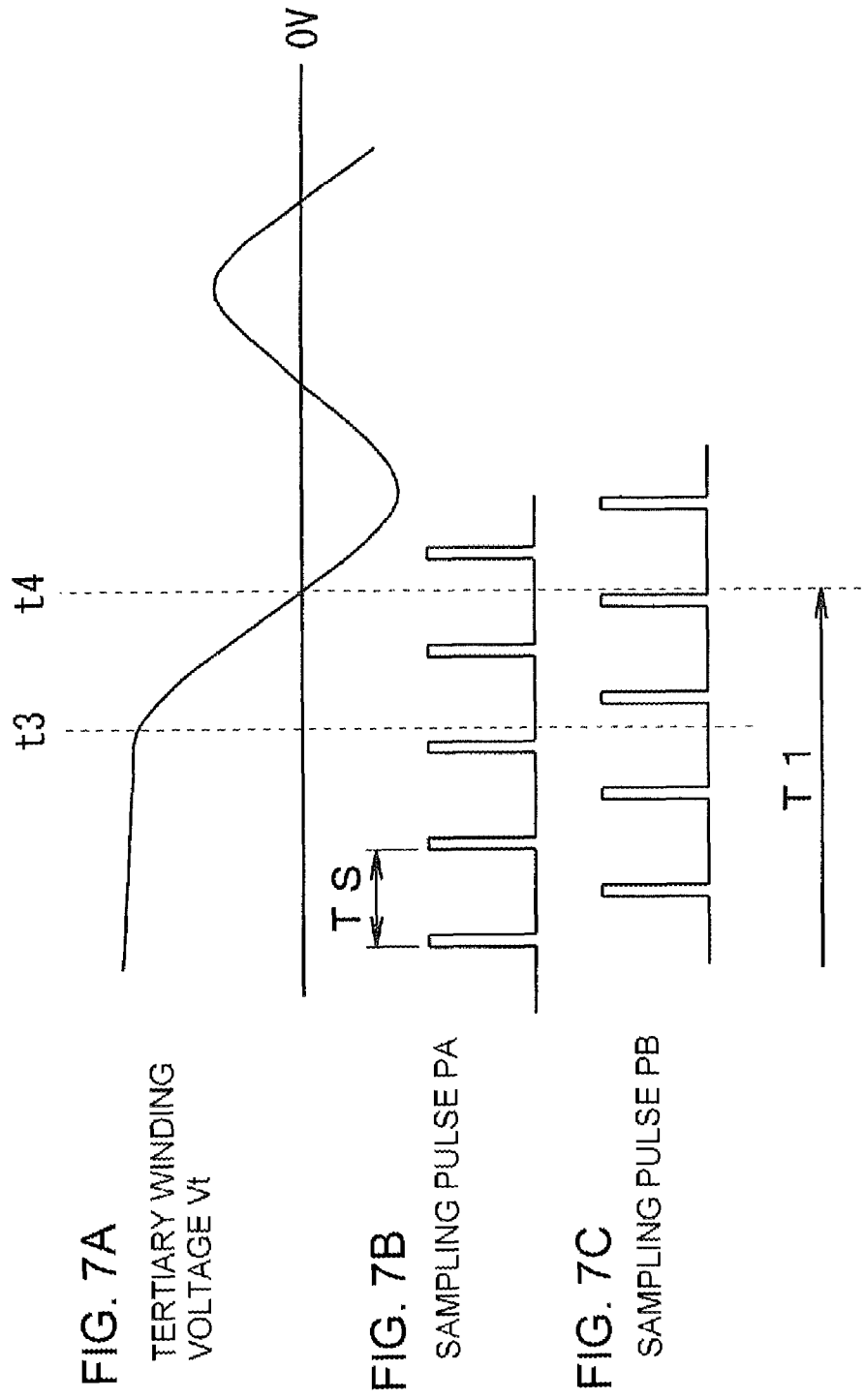

SWITCHING POWER SUPPLY DEVICE AND METHOD FOR CONTROL THEREOF

CROSS-REFERENCE TO RELATED APPLICATIONS

The present application claims priority from Japanese patent application serial number 2011-267227, filed on Dec. 6, 2011 and incorporated herein by reference.

BACKGROUND OF THE INVENTION

1. Field of the Invention

The present invention relates to a flyback switching power supply device, and more particularly, to a switching power supply device that detects a voltage generated in a tertiary winding of a transformer and performs control on the basis of the detected voltage such that an output voltage from a secondary winding of the transformer is a predetermined value.

2. Description of the Related Art

In recent years, as a power supply device for a charger or a power supply device for an alternating current (AC) adapter of a notebook personal computer, a switching power supply device has been used which performs control such that a constant voltage is supplied to a load.

For example, U.S. Pat. No. 7,672,146 discloses this type of switching power supply device.

As illustrated in FIG. 5, the switching power supply device includes a transformer 2, a metal oxide semiconductor (MOS) transistor TR for switching, an output voltage generating unit 4, a feedback signal generating unit 6, and a switching control unit 8.

The transformer 2 includes a primary winding 2-1, a secondary winding 2-2, and a tertiary winding 2-3. A direct current (DC) voltage is applied to one end of the primary winding 2-1 of the transformer 2 and the other end of the primary winding 2-1 is connected to the drain of the MOS transistor TR. The source of the MOS transistor TR is connected to the ground through a resistor RS. The output voltage generating unit 4 includes a diode D1 and a capacitor C1, rectifies the voltage generated in the secondary winding 2-2 of the transformer 2, smoothes the rectified voltage, and outputs the smoothed voltage as an output voltage Vo.

The feedback signal generating unit 6 generates a feedback signal Vfb on the basis of a gate signal Vg input to the gate of the MOS transistor TR and a tertiary winding voltage Vt generated in the tertiary winding 2-3 of the transformer 2. The switching control unit 8 generates the gate signal Vg to be input to the gate of the MOS transistor TR on the basis of a voltage Vrs between both ends of the resistor RS and the feedback signal Vfb from the feedback signal generating unit 6.

Next, the operation of the switching power supply device having the above-mentioned structure will be described with reference to FIGS. 5 to 7C.

The switching control unit 8 outputs the gate signal Vg illustrated in FIG. 6A to the gate of the MOS transistor TR. In response to the gate signal Vg, the MOS transistor TR switches the DC voltage input to the primary winding 2-1 of the transformer 2. That is, the MOS transistor TR turns on or off a path from the DC voltage to the ground potential. Therefore, for a period from a time t1 to a time t2, the MOS transistor TR is turned on and the primary current Ip illustrated in FIG. 6B flows to the primary winding 2-1 of the transformer 2.

At the time t2, the MOS transistor TR is turned off and the secondary current Is illustrated in FIG. 6C starts to flow to the secondary winding 2-2 of the transformer 2. Then, as illustrated in FIG. 6D, the tertiary winding voltage Vt of the tertiary winding 2-3 of the transformer 2 is increased rapidly and is then monotonously decreased for a time t3.

For the period from the time t2 to the time t3, since the secondary current Is flows to the diode D1, the voltage Vs of the secondary winding 2-2, the output voltage Vo, and the forward voltage Vf of the diode D1 satisfy the following relationship: Vs=Vo+Vf.

The tertiary winding voltage Vt for the period is proportional to the voltage Vs of the secondary winding 2-2, and the forward voltage Vf of the diode D1 is changed by the current flowing to the diode D1. Therefore, when the output voltage Vo is estimated by the tertiary winding voltage Vt, an error occurs in the estimation of the output voltage Vo by the current flowing to the diode D1. Therefore, it is necessary to detect the tertiary winding voltage Vt when the current flowing to the diode D1 is very close to zero. The forward voltage Vf of the diode D1 when the current flowing to the diode D1 is zero is constant.

At the time t3, the secondary current Is is zero as illustrated in FIG. 6C, but the tertiary winding voltage Vt oscillates due to, for example, the parasitic capacitance of the MOS transistor TR or the excitation inductance of the transformer 2 as illustrated in FIG. 6D. In parallel to these operations, the feedback signal generating unit 6 generates the feedback signal Vfb as follows on the basis of the gate signal Vg of the MOS transistor TR and the tertiary winding voltage Vt of the transformer 2.

That is, at the time t2, when the gate signal Vg falls as illustrated in FIG. 6A, the feedback signal generating unit 6 starts the detection period T1 of the tertiary winding voltage Vt.

When the detection period T1 starts, the feedback signal generating unit 6 alternately samples and holds the tertiary winding voltage Vt using two sampling pulses PA and PB which are alternately generated at different times, as illustrated in FIGS. 7B and 7C.

Then, at the time t4, when it is detected that the tertiary winding voltage Vt crosses zero, the feedback signal generating unit 6 ends the detection period T1 for which the tertiary winding voltage Vt is sampled.

At the time t4 when the detection period T1 ends, there are a voltage which is sampled and held by the sampling pulse PA illustrated in FIG. 7B and a voltage which is sampled and held by the sampling pulse PB illustrated in FIG. 7C.

Then, the feedback signal generating unit 6 selects one of the two voltages which is sampled and held by the sampling pulse PA before the sampling pulse PB closest to the time t4 when the detection period ends, and outputs the selected voltage as the feedback signal Vfb.

However, in the switching power supply device disclosed in U.S. Pat. No. 7,672,146, when the time t3 has elapsed, a resonance operation starts on the primary side of the transformer 2. Therefore, as illustrated in FIG. 6D, the tertiary winding voltage Vt also starts to oscillate, and the oscillating frequency (resonance frequency) is changed depending on the parasitic capacitance of the MOS transistor TR or the excitation inductance of the transformer 2.

Since the parasitic capacitance of the MOS transistor TR depends on the level of the input voltage, the time when the detection period T1 ends depends on the level of the input voltage. Therefore, the resonance frequency of the tertiary winding voltage Vt varies depending on the input voltage, and the zero-cross time varies depending on the input voltage. As a result, the detection accuracy of the feedback signal Vfb output from the feedback signal generating unit 6 varies depending on the input voltage, and the output voltage Vo of the output voltage generating unit 4 is changed.

That is, when the tertiary winding voltage Vt starts to oscillate, the tertiary winding voltage Vt is changed regardless of the output voltage Vo. Therefore, in order to accurately estimate the value of the output voltage Vo, it is necessary to detect the tertiary winding voltage Vt at the time which is as close to the time t3 as possible, but the difference between the measurement point of time and the time t3 is changed by the input voltage. Therefore, an error occurs in the detection accuracy of the estimated value of the output voltage Vo, that is, the feedback signal Vfb.

As illustrated in FIGS. 7A to 7C, when the frequency of the sampling pulses PA and PB is high, a plurality of (two) sample and hold operations are performed for the period from the time t3 to the time t4, and it is difficult to perform detection in the vicinity of the time t3 at which the detection has been desired to be performed from the beginning. Therefore, it is difficult to increase the frequency of the sampling pulses PA and PB, and the value of the feedback signal Vfb output from the feedback signal generating unit 6 may not be proportional to the output voltage Vo, according to the relationship between the length of the detection period T1 and a sampling cycle TS.

Strictly, the value of the feedback signal Vfb being proportional to the output voltage Vo means that the feedback signal Vfb is a linear function of the output voltage Vo. Therefore, the term "proportion" includes the "linear function". This holds for the following description.

The invention has been made in view of the above-mentioned problems and an object of the invention is to provide a switching power supply device capable of increasing a sampling frequency, reducing the dependence of an output voltage on an input voltage, and improving and stabilizing the detection accuracy of the output voltage.

SUMMARY OF THE INVENTION

In order to achieve the object, the invention has the following structure.

According to an aspect of the invention, a switching power supply device includes: a transformer that includes a primary winding, a secondary winding, and a tertiary winding; an input voltage and a switching element that are connected to the primary winding; an output voltage generating unit that rectifies a voltage which is generated in the secondary winding by a switching operation of the switching element, smoothes the rectified voltage, and outputs the smoothed voltage; an output voltage detecting unit that generates an output voltage detection signal indicating an output voltage from the output voltage generating unit on the basis of a voltage generated in the tertiary winding; and a control unit that controls the on and off of the switching element on the basis of at least the output voltage detection signal output from the output voltage detecting unit such that the output voltage from the output voltage generating unit is a predetermined voltage. The output voltage detecting unit detects the voltage generated in the tertiary winding, compares the detected voltage with a first reference value, compares a voltage obtained by differentiating the detected voltage with a second reference value, and determines the start and end of a detection period on the basis of the two comparison results. The output voltage detecting unit samples and holds the detected voltage with a first sampling pulse and a second sampling pulse within the detection period. When the detection period ends, the output voltage detecting unit selects one of the two sampled and held detected voltages and outputs the selected voltage.

In the switching power supply device according to the above-mentioned aspect of the invention, the output voltage detecting unit may determine the start of the detection period at a time when the detected voltage is equal to or more than the first reference value. The output voltage detecting unit may differentiate the detected voltage and determine the end of the detection period at a time when the differentiated value is negative and an absolute value of the differentiated value is equal to or more than the second reference value.

In the switching power supply device according to the above-mentioned aspect of the invention, the output voltage detecting unit may alternately generate the first sampling pulse and the second sampling pulse at different times.

In the switching power supply device according to the above-mentioned aspect of the invention, the output voltage detecting unit may output one of the two sampled and held detected voltages which is not the latest detected voltage when the detection period ends.

In the switching power supply device according to the above-mentioned aspect of the invention, the output voltage detecting unit may not start the detection period for a predetermined period after the detection period ends, even when the detected voltage is equal to or more than the first reference value.

As described above, in the above-mentioned aspect of the invention, the output voltage detecting unit detects the voltage generated in the tertiary winding of the transformer, compares the detected voltage with the first reference value, compares the voltage obtained by differentiating the detected voltage with the second reference value, and determines the start and end of the detection period on the basis of the two comparison results.

In addition, the output voltage detecting unit samples and holds the detected voltage with the first sampling pulse and the second sampling pulse within the detection period, selects one of the two sampled and held detected voltages when the detection period ends, and outputs the selected detected voltage.

Therefore, according to the above-mentioned aspect of the invention, it is possible to increase a sampling frequency, reduce the dependence of an output voltage on an input voltage, and improve and stabilize the detection accuracy of the output voltage.

BRIEF DESCRIPTION OF THE DRAWINGS

FIGS. 3A to 3D are waveform diagrams illustrating an example of the waveform of each unit for describing an example of the operation of the embodiment;

FIGS. 6A to 6D are waveform diagrams illustrating an example of the waveform of each unit for describing an example of the operation of the device according to the related art; and FIGS. 7A to 7C are waveform diagrams illustrating another example of the operation of the device according to the related art.

DESCRIPTION OF THE PREFERRED EMBODIMENTS

Hereinafter, an exemplary embodiment of the invention will be described with reference to the accompanying drawings.
(Structure of Embodiment)

Figure 1:
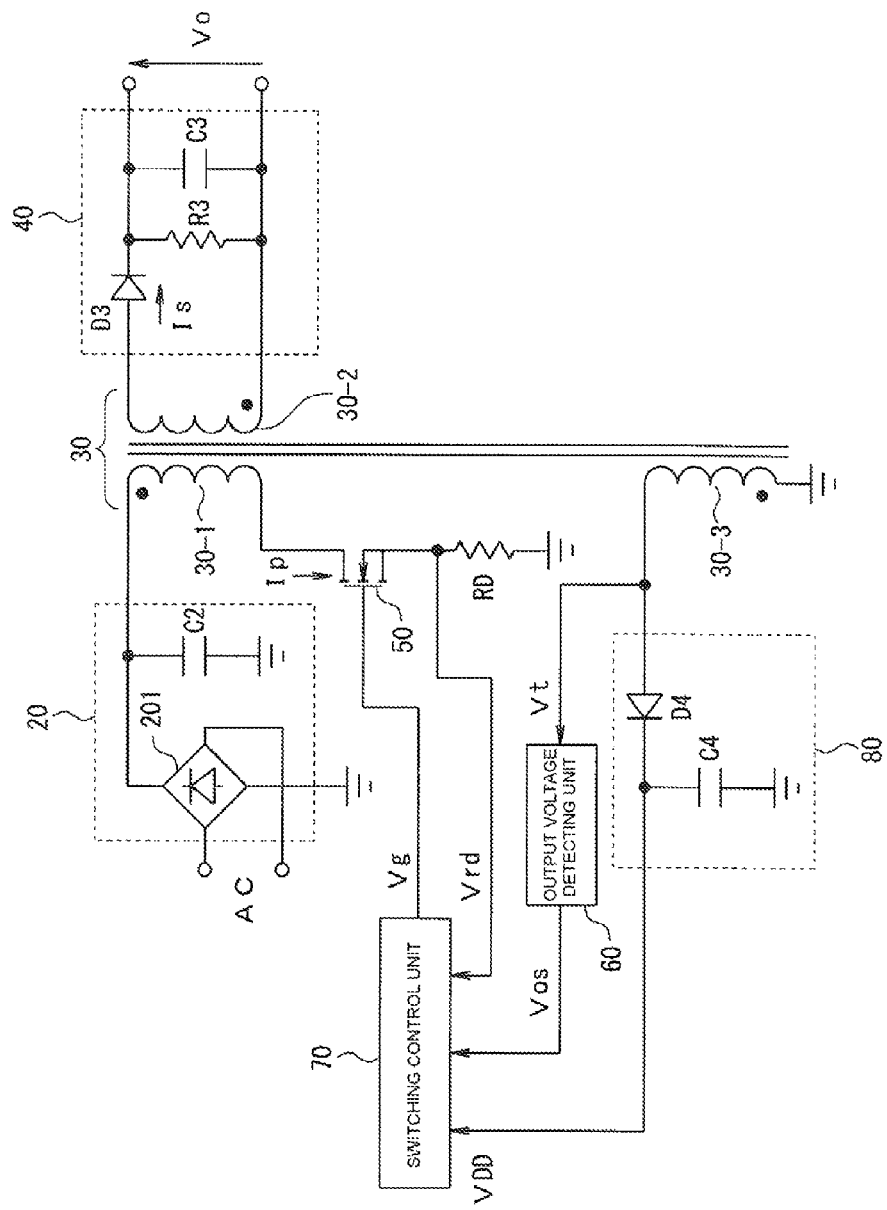
FIG. 1 is a diagram illustrating the structure of a switching power supply device according to an embodiment of the invention.

FIG. 1 is a diagram illustrating the structure of a switching power supply device according to an embodiment of the invention.

As illustrated in FIG. 1, the switching power supply device according to this embodiment includes an input voltage generating unit 20, a transformer 30, an output voltage generating unit 40, a metal oxide semiconductor (MOS) transistor 50, an output voltage detecting unit 60, a switching control unit 70, and a power supply unit 80.

The output voltage detecting unit 60, the switching control unit 70, and the power supply unit 80 are formed on the same semiconductor substrate.

The input voltage generating unit 20 receives an input alternating current (AC) voltage AC, rectifies the input voltage, smoothes the input voltage, and outputs a direct current (DC) voltage. Therefore, the input voltage generating unit 20 includes a diode bridge circuit 201 that rectifies the AC voltage AC and a capacitor C2 that smoothes the rectified voltage.

The transformer 30 includes a primary winding 30-1, a secondary winding 30-2, and a tertiary winding 30-3. The DC voltage output from the input voltage generating unit 20 is applied to one end of the primary winding 30-1 of the transformer 30, and a drain of the MOS transistor 50 is connected to the other end of the primary winding 30-1.

The output voltage generating unit 40 rectifies the AC voltage generated in the secondary winding 30-2 of the transformer 30, smoothes the rectified voltage, and outputs the smoothed voltage as an output voltage Vo. Therefore, as illustrated in FIG. 1, the output voltage generating unit 40 includes a rectifying diode D3, a smoothing capacitor C3, and a bleeder resistor R3. The bleeder resistor R3 may not be provided according to applications.

The MOS transistor 50 functions as a switching element that is connected in series to the primary winding 30-1 of the transformer 30 and switches the DC voltage applied to one end of the primary winding 30-1. Therefore, the drain of the MOS transistor 50 is connected to one end of the primary winding 30-1 and the source of the MOS transistor 50 is connected to the ground through a detection resistor RD. In addition, a gate signal Vg output from the switching control unit 70 is input to the gate of the MOS transistor 50, which controls the on and off of the MOS transistor 50.

The output voltage detecting unit 60 detects the voltage between both ends of the tertiary winding 30-3 of the transformer 30, generates an output voltage detection signal Vos on the basis of the detected voltage, and inputs the generated output voltage detection signal Vos to the switching control unit 70. The reason why the voltage between both ends of the tertiary winding 30-3 of the transformer 30 is detected is that the detected voltage is proportional to the output voltage Vo from the output voltage generating unit 40 connected to the secondary winding 30-2 of the transformer 30.

The switching control unit 70 generates a gate signal Vg that controls the on and off of the MOS transistor 50 such that the output voltage Vo from the output voltage generating unit 40 is a predetermined voltage, on the basis of the output voltage detection signal Vos of the output voltage detecting unit 60 and a voltage Vrd between both ends of the detection resistor RD which is proportional to the value of the current flowing through the MOS transistor 50. The generated gate signal Vg is supplied to the gate of the MOS transistor 50.

The voltage Vrd between both ends of the detection resistor RD which is proportional to the value of the current flowing through the MOS transistor 50 is detected when the switching power supply device is in the current mode. When the switching power supply device is in the voltage mode and the voltage Vrd is not used in a protection operation, it is not necessary to detect the current value of the MOS transistor 50.

The power supply unit 80 rectifies the AC voltage generated in the tertiary winding 30-3 of the transformer 30 and smoothes the rectified voltage. The smoothed voltage is supplied as a power supply voltage VDD for the switching control unit 70 to the switching control unit 70. Therefore, the power supply unit 80 includes a rectifying diode D4 and a smoothing capacitor C4. The capacitor C4 may not be provided on the semiconductor substrate, but may be provided outside. In this case, in order to reduce the number of terminals, the diode D4 may also be provided outside.
(Structure of Output Voltage Detecting Unit)

Next, the detailed structure of the output voltage detecting unit 60 illustrated in FIG. 1 will be described with reference to FIG. 2.

Figure 2:
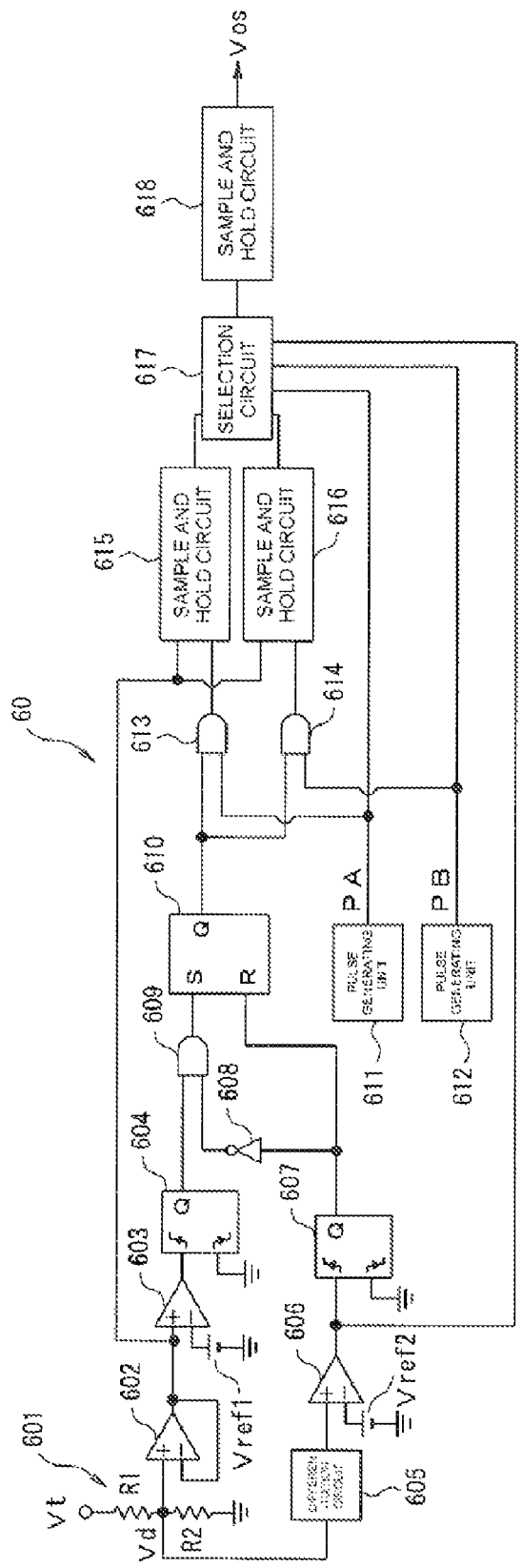
FIG. 2 is a circuit diagram illustrating the detailed structure of an output voltage detecting unit of FIG. 1.

As illustrated in FIG. 2, the output voltage detecting unit 60 includes a voltage detection circuit 601, a buffer circuit (voltage follower) 602, a comparison circuit (comparator) 603, a monostable multi-vibrator 604, a differentiation circuit 605, a comparison circuit 606, a monostable multi-vibrator 607, an inverter 608, and an AND circuit 609.

As illustrated in FIG. 2, the output voltage detecting unit 60 further includes an SR latch circuit (SR flip-flop circuit) 610, pulse generators 611 and 612, AND circuits 613 and 614, sample and hold circuits 615 and 616, a selection circuit 617, and a sample and hold circuit 618.

The voltage detection circuit 601 includes voltage-dividing resistors R1 and R2 that are connected in series to each other, and divides a tertiary winding voltage Vt of the tertiary winding 30-3 of the transformer 30. An input terminal of the buffer circuit 602 is connected to a common connection portion between the voltage-dividing resistors R1 and R2.

A non-inverted input terminal (+) of the comparison circuit 603 is connected to an output terminal of the buffer circuit 602. A reference voltage Vref1 is applied to an inverted input terminal (−) of the comparison circuit 603. An output terminal of the comparison circuit 603 is connected to one input terminal of the monostable multi-vibrator 604. The other input terminal of the monostable multi-vibrator 604 is connected to the ground. A Q output terminal of the monostable multi-vibrator 604 is connected to one input terminal of the AND circuit 609.

The differentiation circuit 605 receives a divided voltage Vd output from the voltage detection circuit 601, differentiates the input divided voltage Vd, and outputs the differentiated voltage. The differentiation circuit 605 includes, for example, an operational amplifier, a resistor, and a capacitor and obtains an output voltage −K·d(Vd)/dt (where K is a positive constant) for the input divided voltage Vd.

An output terminal of the differentiation circuit 605 is connected to a non-inverted input terminal (+) of the comparison circuit 606. A reference voltage Vref2 is applied to an inverted input terminal (−) of the comparison circuit 606. An output terminal of the comparison circuit 606 is connected to one input terminal of the monostable multi-vibrator 607.

The other input terminal of the monostable multi-vibrator 607 is connected to the ground. A Q output terminal of the monostable multi-vibrator 607 is connected to the other input terminal of the AND circuit 609 through the inverter 608 and is also connected to a reset input terminal (R) of the SR latch circuit 610. An output terminal of the AND circuit 609 is connected to a set input terminal (S) of the SR latch circuit 610.

Figure 4A:
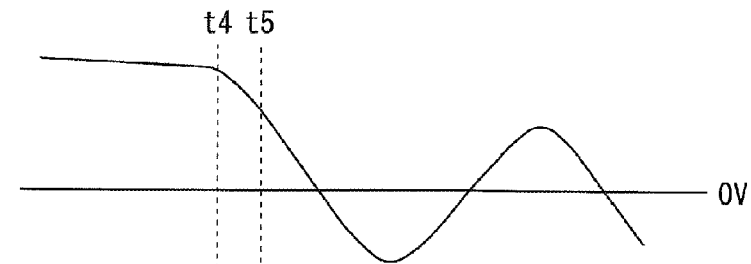
FIGS. 4A to 4D are waveform diagrams illustrating another example of the waveform of each unit for describing an example of the operation of the embodiment.
Figure 4B:
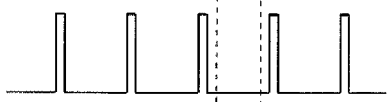
Figure 4C:

A Q output terminal of the SR latch circuit 610 is connected to one input terminal of each of the AND circuit 613 and the AND circuit 614. The pulse generator 611 generates a sampling pulse PA and the pulse generator 612 generates a sampling pulse PB. For example, as illustrated in FIGS. 4B and 4C, the pulse generators 611 and 612 alternately generate the sampling pulse PA and the sampling pulse PB at different times.

The sampling pulse PA generated by the pulse generator 611 is supplied to the sample and hold circuit 615 through the AND circuit 613 and is also directly supplied to the selection circuit 617. The sampling pulse PB generated by the pulse generator 612 is supplied to the sample and hold circuit 616 through the AND circuit 614 and is also directly supplied to the selection circuit 617. In addition, an output signal from the buffer circuit 602 is input as a signal to be sampled and held to the sample and hold circuits 615 and 616.

Within a detection period, the sample and hold circuit 615 samples and holds the voltage Vd divided by the voltage detection circuit 601, which is the output of the buffer circuit 602, with the sampling pulse PA output from the pulse generator 611, which will be described below. Within the detection period, the sample and hold circuit 616 samples and holds the voltage Vd divided by the voltage detection circuit 601 with the sampling pulse PB output from the pulse generator 612, which will be described below.

When the detection period ends, the selection circuit 617 selects a predetermined voltage from the two voltages sampled and held by the sample and hold circuits 615 and 616 and outputs the selected voltage. When the voltage is selected and output, the selection circuit 617 performs the selection operation using the sampling pulses PA and PB output from the pulse generators 611 and 612.

The sample and hold circuit 618 holds the voltage selected by the selection circuit 617 until the next new voltage is selected, and outputs the selected voltage as the output voltage detection signal Vos to the switching control unit 70.

(Operation of Embodiment)

Next, an example of the operation of the embodiment having the above-mentioned structure will be described with reference to FIGS. 1 to 4D.

The switching control unit 70 outputs a gate signal Vg illustrated in FIG. 3A as a control signal to the gate of the MOS transistor 50. It is assumed that, when the gate signal Vg is at an H (high) level, the MOS transistor 50 is turned on. In response to the gate signal Vg, the MOS transistor 50 switches the DC voltage input to the primary winding 30-1 of the transformer 30. Therefore, for the period from a time t1 to a time t2, the MOS transistor 50 is turned on and a primary current Ip illustrated in FIG. 3B flows through the primary winding 30-1 of the transformer 30.

At the time t2, the MOS transistor 50 is turned off and a secondary current Is illustrated in FIG. 3C starts to flow to the secondary winding 30-2 of the transformer 30. Then, the tertiary winding voltage Vt generated in the tertiary winding 30-3 of the transformer 30 increases rapidly and is then monotonously reduced. The reason why the tertiary winding voltage Vt is monotonously reduced is that the forward voltage of the diode D3 is reduced with a reduction in the secondary current Is, as described above.

Therefore, as illustrated in FIG. 3D, the voltage Vd obtained by dividing the tertiary winding voltage Vt of the transformer 30 in the voltage detection circuit 601 increases rapidly at the time t2 and is then monotonously reduced to a time t4.

At the time t4, as illustrated in FIG. 3C, the secondary current Is becomes zero and a resonance operation starts on the primary side of the transformer 30 due to, for example, the parasitic capacitance of the MOS transistor 50 or the excitation inductance of the transformer 30, which results in the oscillation of the tertiary winding voltage Vt. Therefore, as illustrated in FIG. 3D, the voltage Vd obtained by dividing the tertiary winding voltage Vt of the transformer 30 in the voltage detection circuit 601 starts to oscillate at the time t4.

In parallel to these operations, the output voltage detecting unit 60 illustrated in FIG. 2 performs the following operation to generate the output voltage detection signal Vos on the basis of the tertiary winding voltage Vt of the transformer 30.

The tertiary winding voltage Vt of the transformer 30 is divided by the voltage detection circuit 601 and the divided voltage Vd is applied to each of the comparison circuit 603 and the sample and hold circuits 615 and 616 through the buffer circuit 602. In addition, the divided voltage Vd is supplied to the differentiation circuit 605.

The comparison circuit 603 compares the divided voltage Vd with the reference voltage Vref1. When the divided voltage Vd is equal to or more than the reference voltage Vref1, the comparison circuit 603 outputs an H-level signal. Therefore, at the time t3, when the divided voltage Vd is equal to or more than the reference voltage Vref1, the comparison circuit 603 outputs the H-level signal. In this way, an H-level pulse signal is output from the output terminal (Q) of the monostable multi-vibrator 604.

In this case, since the output of the inverter 608 is at an H level, the H-level pulse signal output from the output terminal (Q) of the monostable multi-vibrator 604 is input to the set terminal (S) of the SR latch circuit 610 through the AND circuit 609. Then, the output signal from the output terminal (Q) of the SR latch circuit 610 becomes an H level and the H-level output signal is supplied to each of the AND circuits 613 and 614.

Therefore, at the time t3, a detection period (measurement period) T2 starts. For the detection period T2, the sampling pulses PA and PB generated by the pulse generators 611 and 612 are supplied to the sample and hold circuits 615 and 616 through the AND circuits 613 and 614, respectively.

Therefore, for the detection period T2, the sample and hold circuit 615 samples and holds the divided voltage Vd of the voltage detection circuit 601 with the sampling pulse PA. For the detection period T2, the sample and hold circuit 616 samples and holds the divided voltage Vd of the voltage detection circuit 601 with the sampling pulse PB.

The differentiation circuit 605 differentiates the divided voltage Vd of the voltage detection circuit 601 and outputs the differentiated voltage. The comparison circuit 606 compares the output voltage from the differentiation circuit 605 with the reference voltage Vref2 and outputs a signal corresponding to the comparison result.

Figure 4D:
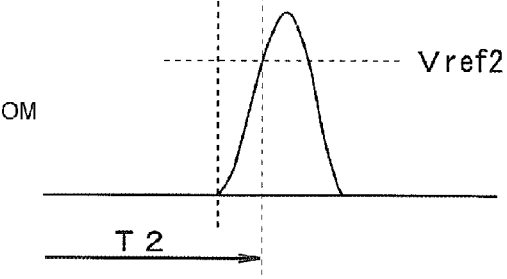
Figure 5:
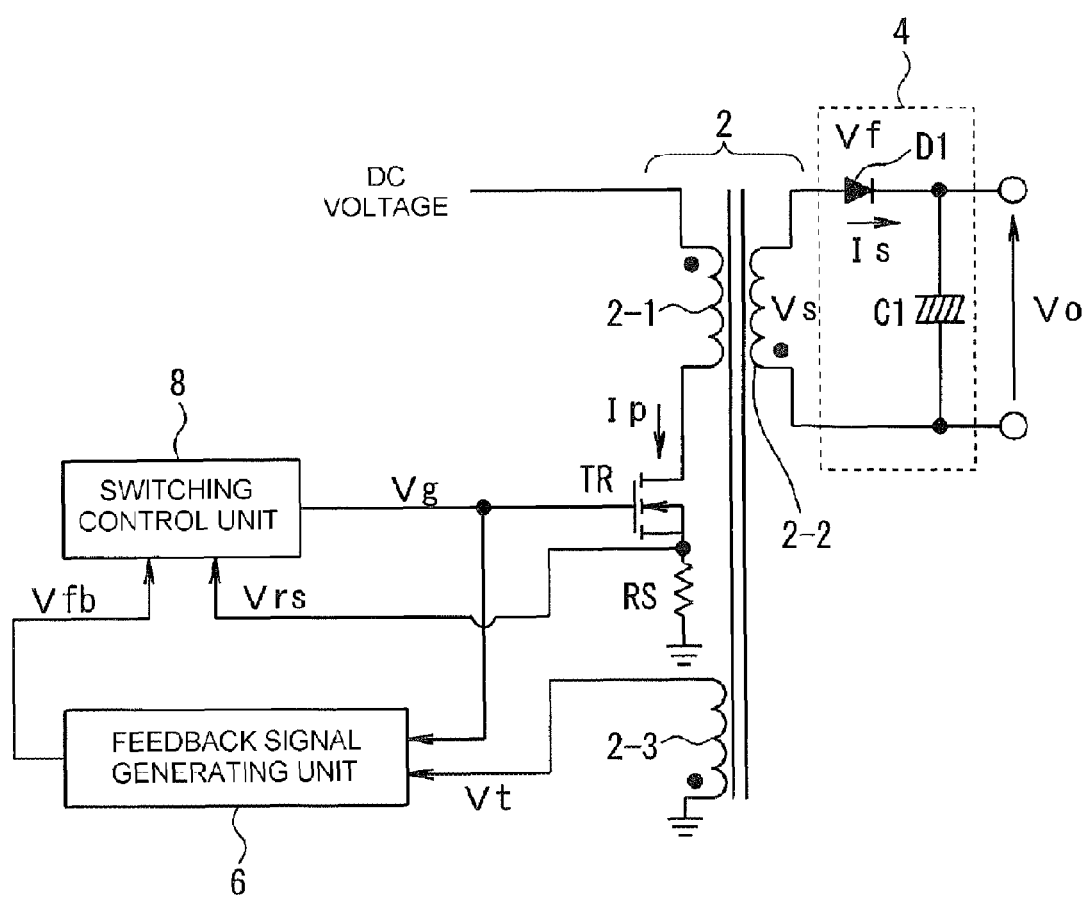
FIG. 5 is a diagram illustrating the outline of the structure of a device according to the related art.

As described above, at the time t4, as illustrated in FIG. 4A, when the divided voltage Vd of the voltage detection circuit 601 starts to oscillate and then starts to be reduced, the output voltage from the differentiation circuit 605 starts to increase, as illustrated in, for example, FIG. 4D. The differentiated value of the divided voltage Vd itself is negative. However, as described above, since the differentiation circuit 605 inverts the differentiated value, the output voltage from the differentiation circuit 605 illustrated in FIG. 4D is positive. At a time t5, when the output voltage from the differentiation circuit 605 is equal to or more than reference voltage Vref2, the output signal from the comparison circuit 606 is changed to an H level.

When the output signal from the comparison circuit 606 is changed to the H level, an H-level pulse signal is output from the output terminal (Q) of the monostable multi-vibrator 607 and is then input to the reset terminal (R) of the SR latch circuit 610. Then, an L-level signal is output from the output terminal (Q) of the SR latch circuit 610 and is then input to each of the AND circuits 613 and 614. Therefore, the sampling pulses PA and PB generated by the pulse generators 611 and 612 do not pass through the AND circuits 613 and 614 and are not supplied to the sample and hold circuits 615 and 616.

Therefore, at the time t5, the detection period T2 ends and the sample and hold circuits 615 and 616 stop the operation of sampling and holding the divided voltage Vd of the voltage detection circuit 601.

At the time when the detection period T2 ends (time t5), the selection circuit 617 outputs the voltage, which is held at the time which is not close to the time t5 and is not the latest voltage, of the two voltages held by the sample and hold circuits 615 and 616.

In this example, as illustrated FIG. 4B, the voltage that is sampled and held by the sample and hold circuit 615 with the sampling pulse PA is selected. The selection circuit 617 selects and outputs the voltage with reference to the sampling pulses PA and PB output from the pulse generators 611 and 612. That is, the voltage that is sampled and held by one of the sampling pulses PA and PB which is not input immediately before the time t5 is selected.

The sample and hold circuit 618 holds the selected voltage until the next new voltage is selected and outputs the selected voltage as the output voltage detection signal Vos to the switching control unit 70.

The switching control unit 70 generates the gate signal Vg on the basis of the output voltage detection signal Vos output from the sample and hold circuit 618 and the voltage Vrd (which is proportional to the current flowing through the MOS transistor 50) across the detection resistor RD. The gate signal Vg is for controlling the on and off of the MOS transistor 50 such that the output voltage Vo from the output voltage generating unit 40 is a predetermined voltage, and is supplied to the gate of the MOS transistor 50.

However, as described above, at the time t5, when the output signal from the comparison circuit 606 is changed to an H level, an H-level pulse signal is output from the output terminal (Q) of the monostable multi-vibrator 607. The H-level pulse signal is inverted into an L-level pulse signal by the inverter 608 and is then supplied to the AND circuit 609. Therefore, while the pulse signal is maintained at the L level, the output signal from the monostable multi-vibrator 604 cannot pass through the AND circuit 609.

In this way, by making the width of the output pulse from the monostable multi-vibrator 607 somewhat longer, it is possible to prevent the latch circuit 610 from being erroneously reset due to the oscillation of the divided voltage Vd of the voltage detection circuit 601 after the SR latch circuit 610 is reset. As a result, after the detection period T2 ends, the sample and hold circuits 615 and 616 do not operate.

As described above, in this embodiment, the tertiary winding voltage Vt of the transformer 30 is divided to obtain the divided voltage Vd and the detection period starts at the time when the divided voltage Vd is equal to or more than the reference voltage Vref1. In addition, the divided voltage Vd is differentiated and the detection period ends at the time when the differentiated and inverted voltage is equal to or more than the reference voltage Vref2. The time until the divided voltage Vd is reduced and the absolute value of the differentiated value of the voltage is increased to be more than a predetermined value after the time t3 can be significantly shorter than the time until the voltage crosses zero in U.S. Pat. No. 7,672,146. Therefore, it is possible to increase the frequency of the sampling pulses PA and PB.

In this embodiment, within the detection period, the divided voltage Vd is sampled and held by the sampling pulses PA and PB. After the detection period ends, one of the two sampled and held detected voltages which is held at the time which is not close to the end time and is not the latest holding voltage is output.

Therefore, in this embodiment, as illustrated in FIG. 4B, the voltage which is sampled and held by the sampling pulse PA can be selected. The selected voltage is a voltage immediately before the time t4 when oscillation starts and the error of the selected voltage due to the current flowing through the diode D3 is significantly reduced. Therefore, the output voltage Vo is accurately reflected to the selected voltage.

Therefore, according to this embodiment, it is possible to increase the sampling frequency, reduce the dependence of the output voltage on the input voltage, and improve and stabilize the detection accuracy of the output voltage.

In the above-described embodiment, two sample and hold circuits are provided for the divided voltage Vd. However, three or more sample and hold circuits may be provided. In this case, three or more pulse generating circuits are prepared and generate sampling pulses with different phases. The following ways may be considered for three or more sample and hold data items.

In a first example, sample and hold data which is applied as the output voltage detection signal Vos is switched according to a constant for determining the oscillation period of the divided voltage Vd after the time t4 (for example, between a sample data item that is two sample data items before the time t5 or a sample data item that is three sample data items before the time t5). In a second example, the value of the time t4 is estimated (calculated) by three or more sample data items.

It will be understood by those skilled in the art that the invention may be practiced otherwise than as described in the disclosed embodiments without departing from the scope of the invention.

What is claimed is:

1. A switching power supply device comprising:
   a transformer that includes a primary winding, a secondary winding, and a tertiary winding, where the primary winding is connected to an input voltage;
   a switching element connected to the primary winding;
   an output voltage generating unit that outputs an output voltage according to a secondary winding voltage generated in the secondary winding;
   an output voltage detecting unit that generates an output voltage detection signal representing the output voltage according to a detected voltage on the tertiary winding; and
   a control unit that controls switching the switching element on and off according to at least the output voltage detection signal, such that the output voltage is controlled to be a predetermined voltage, wherein
   the output voltage detecting unit compares the detected voltage with a first reference value in a first comparison, differentiates the detected voltage to provide a differentiated value, compares the differentiated value with a second reference value in a second comparison, and determines a start and an end of a detection period on the basis of results of the first and second comparisons, the output voltage detecting unit samples and holds the detected voltage with a first sampling pulse and a second sampling pulse within the detection period, and when the detection period ends, the output voltage detecting unit selects one of the two sampled and held voltages and outputs the selected voltage as the output voltage detection signal.

2. The switching power supply device according to claim 1, wherein the output voltage detecting unit determines the start of the detection period to be a time when the detected voltage is equal to or more than the first reference value, and the output voltage detecting unit determines the end of the detection period to be a time when the differentiated value is negative and a magnitude of the differentiated value is equal to or more than the second reference value.

3. The switching power supply device according to claim 2, wherein the output voltage detecting unit alternately generates the first sampling pulse and the second sampling pulse at different times.

4. The switching power supply device according to claim 3, wherein the output voltage detecting unit outputs the one of the two sampled and held detected voltages that is the earlier detected voltage when the detection period ends.

5. The switching power supply device according to claim 2, wherein the output voltage detecting unit starts the detection period after a predetermined period when the detection period ends.

6. The switching power supply device according to claim 1, wherein the output voltage detecting unit alternately generates the first sampling pulse and the second sampling pulse at different times.

7. The switching power supply device according to claim 6, wherein the output voltage detecting unit outputs the one of the two sampled and held detected voltages that is the earlier detected voltage when the detection period ends.

8. The switching power supply device according to claim 1, wherein the output voltage detecting unit starts the detection period after a predetermined period when the detection period ends.

9. The switching power supply device according to claim 1, wherein the output voltage detecting unit includes a voltage detection circuit that detects the detected voltage on the tertiary winding, a differentiation circuit that differentiates the detected voltage to output the differentiated value, a detection period signal generating circuit that generates a detection period signal that starts the detection period when the voltage detected by the voltage detection circuit is compared with the first reference value and the detected voltage is equal to or more than the first reference value and ends the detection period when the differentiation value is compared with the second reference value, the differentiation value is negative, and the magnitude of the differentiation value is equal to or more than the second reference value, and outputs the generated detection period signal, a first sample and hold circuit that samples and holds the voltage detected by the voltage detection circuit as a first detected voltage with the first sampling pulse within a period during which the detection period signal is output from the detection period signal generating circuit, a second sample and hold circuit that samples and holds the voltage detected by the voltage detection circuit as a second detected voltage with the second sampling pulse within the period during which the detection period signal is output from the detection period signal generating circuit, and a selection circuit that selects one of the first and second detected voltages that are sampled and held and outputs the selected detected voltage.

10. The switching power supply device according to claim 9, wherein the output voltage detecting unit and the control unit are formed on a single semiconductor substrate.

11. The switching power supply device according to claim 1, wherein the output voltage detecting unit and the control unit are formed on a single semiconductor substrate.

12. A method for controlling a switching power supply device comprising:

switching on and off repetitively an input voltage supplied to a primary winding voltage of a transformer;

generating an output voltage according to a secondary winding voltage in a secondary winding of the transformer;

detecting a voltage on a tertiary winding of the transformer and generating therefrom an output voltage detection signal representing the output voltage; and controlling the switching on and off of the input voltage according to at least the output voltage detection signal, such that the output voltage is controlled to be a predetermined voltage, comparing the detected voltage with a first reference value in a first comparison, differentiating the detected voltage to provide a differentiated value, comparing the differentiated value with a second reference value in a second comparison, and determining a start and an end of a detection period on the basis of results of the first and second comparisons, sampling and holding the detected voltage with a first sampling pulse and a second sampling pulse within the detection period, and when the detection period ends, selecting one of the two sampled and held voltages and outputting the selected voltage as the output voltage detection signal.

13. The method according to claim 12, further comprising determining the start of the detection period to be a time when the detected voltage is equal to or more than the first reference value, and determining the end of the detection period to be a time when the differentiated value is negative and a magnitude of the differentiated value is equal to or more than the second reference value.

14. The method according to claim 13, further comprising alternately generating the first sampling pulse and the second sampling pulse at different times.

15. The method according to claim 14, further comprising outputting the one of the two sampled and held detected voltages that is the earlier detected voltage when the detection period ends.

16. The method according to claim 13, further comprising delaying starting the detection period for a predetermined period after the detection period ends.

17. The method according to claim 12, further comprising alternately generating the first sampling pulse and the second sampling pulse at different times.

18. The method according to claim 17, further comprising outputting the one of the two sampled and held detected voltages that is the earlier detected voltage when the detection period ends.

19. The method according to claim 12, further comprising delaying starting the detection period for a predetermined period after the detection period ends.

20. The method according to claim 12, further comprising:
generating a detection period signal that starts the detection period when the detected voltage is compared with the first reference value and the detected voltage is equal to or more than the first reference value and ends the detection period when the differentiation value is compared with the second reference value, the differentiation value is negative, and the magnitude of the differentiation value is equal to or more than the second reference value, and outputting the generated detection period signal, sampling and holding the detected voltage as a first detected voltage with the first sampling pulse within a period for which the detection period signal is output from the detection period signal generating circuit, sampling and holding the detected voltage as a second detected voltage with the second sampling pulse within the period for which the detection period signal is output, and selecting one of the first and second detected voltages that are sampled and held and outputting the selected voltage.

* * * * *